United States Patent
Hara et al.

(10) Patent No.: US 9,765,196 B2
(45) Date of Patent: Sep. 19, 2017

(54) INORGANIC IONOMERS MADE FROM MINERALS

(71) Applicant: Rutgers, The State University of New Jersey, New Brunswick, NJ (US)

(72) Inventors: Masanori Hara, Plainsboro, NJ (US); Richard Lehman, Princeton, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 233 days.

(21) Appl. No.: 14/628,092

(22) Filed: Feb. 20, 2015

(65) Prior Publication Data
US 2015/0274927 A1 Oct. 1, 2015

Related U.S. Application Data

(60) Provisional application No. 61/942,326, filed on Feb. 20, 2014.

(51) Int. Cl.
C08K 3/34 (2006.01)
H01M 8/1048 (2016.01)
C08K 5/3445 (2006.01)
C08K 3/04 (2006.01)

(52) U.S. Cl.
CPC .............. *C08K 3/34* (2013.01); *C08K 5/3445* (2013.01); *H01M 8/1048* (2013.01); *C08K 2003/045* (2013.01)

(58) Field of Classification Search
None
See application file for complete search history.

(56) References Cited

U.S. PATENT DOCUMENTS

| 8,623,189 | B2 | 1/2014 | Eckhardt et al. | |
|---|---|---|---|---|
| 8,802,596 | B2 | 8/2014 | Rogers et al. | |
| 2011/0045277 | A1 | 2/2011 | Greer et al. | |
| 2011/0065020 | A1* | 3/2011 | Uensal | C08J 5/2256 429/492 |
| 2015/0299398 | A1* | 10/2015 | Iijima | C08K 5/34 525/474 |

OTHER PUBLICATIONS

Johnson, "What is an Ionic Liquid?" Electrochem Soc Interface, Spring 2007, pp. 38-41.
Wasserscheid and Keim, "Ionic Liquids—New 'Solutions' for Transition Metal Crystals," Agnew Chem Int Ed Engl, 2000, vol. 39, Issue 21, p. 3772-3789 (Abstract only).
Wasserscheid and Welton (Eds.), "Ionic Liquids in Synthesis," 1st Ed. , Wiley-VCH, 2002 (Introduction only).
Welton, T., "Room-Temperature Ionic Liquids. Solvents for Synthesis and Catalysis," Chem Rev, 1999, vol. 99, No. 8, pp. 2071-2083 (Abstract only).

* cited by examiner

*Primary Examiner* — Robert S Loewe
(74) *Attorney, Agent, or Firm* — Fox Rothschild LLP

(57) ABSTRACT

Inorganic polymers are produced from silicate (—Si—O—) and/or phosphonate (—P—O—) bonds, commonly found in rocks and glass, to create new polymeric materials for rubbers, fibers, and plastics. These inorganic polymers have various advantages over organic counterparts including abundance on the earth's crust, and properties including nonflammability, low toxicity, recyclability, and excellent thermal and chemical resistance.

20 Claims, 6 Drawing Sheets

100 °C

150 °C

200 °C

INORGANIC IONOMERS MADE FROM MINERALS

CROSS-REFERENCE TO RELATED APPLICATIONS

This application claims priority under 35 USC §119(e) to U.S. Provisional Patent Application Ser. No. 61/942,326, filed on Feb. 20, 2014, which is hereby incorporated by reference in its entirety.

FIELD OF THE INVENTION

The invention relates to inorganic ionomers comprising silicate (—Si—O—) and/or phosphonate (—P—O—) and methods of producing such ionomers. Various modifications of the ionomers including admixing with an ionic liquid and cross-linking with a divalent cation are also provided.

BACKGROUND OF THE INVENTION

Many polymers (such as rubbers, fibers and resins) based on organic polymers are reliant on fossil fuel resources (e.g., oil) as feedstocks, are flammable, produce toxic chemicals upon degradation/burning, and have poor chemical and thermal resistance.

Carbon-based organic polymers, based on organic (carbon) chemistry, have shown considerable progress and impacts on our lives. However, they have drawbacks to be overcome. The most serious one is the reliance on oil for production, which is a limited and localized natural resource. Another disadvantage of organic polymers is the lack of thermal resistance—carbon-based bonds are broken irreversibly, leading to degradation and production of harmful chemicals. They are also in general flammable and attacked by many chemicals.

An ionomer is a polymer that comprises both electrically neutral repeating units and some fraction of ionized units, either covalently bonded to the polymer backbone as pendant moieties or as part of the polymer backbone itself. This means that most ionomers are copolymers of the neutral segments and the ionized units, which usually consist of acidic groups. The usefulness of introducing ionic bonds into organic polymers, has been recognized. Thus, the commercial organic ionomer Surlyn® (polyethylene-based ionomer), has impact properties significantly better than the parent polymer, polyethylene. Nafion® (polytetrafluoroethylene-based ionomer) is widely used as membranes for fuel cells. Recently, Surlyn-type polymers have been found to self-heal after projectile puncture. Rapid closing and sealing of the holes has been attributed to the reformation of bonds (self-healing) in the melt polymer chains around the hole. This behavior is caused by the reformation of reversible bonds. However, as described above, these ionomers based on carbon-based organic polymers have similar drawbacks to the typical organic polymers.

BRIEF SUMMARY OF THE INVENTION

The inorganic polymers of the present invention overcome the shortcomings of the organic polymers. Because the Si—O and/or P—O bonds are more resistant to thermal cleavage than C—C bonds in polymers; the inventive inorganic polymers have superior properties such as chemical and thermal stability versus the known organic ionomers. Incorporation of ionic bonds (e.g., to Na) provides reversible and healable polymeric materials. Incorporation of stronger ionic bonds (e.g., to Ca) makes materials stiffer and stronger. Unlike carbon-based organic polymers made from oil, these inorganic polymers are cheaper to produce, less flammable, and less toxic, all of which are advantageous for commercial applications.

One aspect of the present invention provides a polymer composition comprising an ionic liquid and an inorganic ionomer comprising repeating units of the structure I or II:

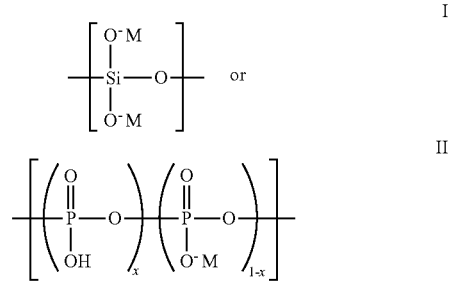

wherein 0≤x<1 and each M is an alkali metal cation independently selected from the group consisting of Lithium$^+$ (Li$^+$), Sodium$^+$ (Na$^+$), Potassium$^+$ (K$^+$), Rubidium$^+$ (Rb$^+$) and Cesium$^+$ (Cs$^+$), wherein said ionic liquid has melt point lower than 30° C. and is present in an amount effective to increase the free volume of said inorganic ionomer.

In some embodiments, the ionic liquid is selected from the group consisting of 1-ethyl-3-methylimidazolium triflate, choline dihydrogenphosphate, ethylammonium nitrate, triethylsulfonium bis(trifluoromethylsulfonyl)imide, 1-butylpyridinium bis(trifluoromethyl-sulfonyl)imide, 1-allyl-3-methylimidazolium iodide, 1-ethyl-3-methylimidazolium diethylphosphate, 1-butyl-3-methylimidazolium hexafluorophosphate, 1-ethyl-3-methylimidazolium ethyl sulfate and combinations thereof. In some embodiments, the molar ratio between the ionic liquid and the anion of the inorganic ionomer ranges from 1:1 to 1:16.

In some embodiments, the polymer composition further comprises divalent cations crosslinking the inorganic ionomer anions. In some embodiments, the divalent cations are Calcium$^{2+}$, Barium$^{2+}$, or a combination thereof.

In some embodiments, the inorganic ionomer comprises repeating units of the structure I and further comprises a second unit of structure I, wherein M of said second unit is a positively charged transition metal cation derived from a transition metal in groups 3 to 12 on the periodic table. In some embodiments, the inorganic ionomer comprises repeating units of the structure II and further comprises a second unit of structure II, wherein M of said second unit is a positively charged transition metal cation derived from a transition metal in groups 3 to 12 on the periodic table. In some embodiments, the transition metal is Nickel, Palladium, Platinum, Copper or Gold. Different transition metals can also co-exist in an ionomer.

In some embodiments, the inorganic ionomer further comprises a conductive material which is carbon black, graphite, carbon nanotube, graphene, or a combination thereof.

In some embodiments, the inorganic ionomer does not contain carbon. In some embodiments, the ionomer contains carbon.

In some embodiments, the inorganic ionomer further comprises a carbon-based polymer more ductile than said inorganic ionomer and admixed with said ionic liquid and said inorganic ionomer in an amount effective to increase the ductility of said composition. In some embodiments, the carbon-based polymer is poly(ethylene oxide), poly(propylene oxide), poly(phenylene oxide) or a combination thereof.

In some embodiments, the ration between $SiO_2$ and $M_2O$ ranges from about 1:1 to about 3.25:1.

In some embodiments, the glass transition temperature of the inorganic ionomer is lower than about 250° C.

Another aspect of the invention provides a method of preparing a polymer composition comprising:
 a) providing an inorganic ionomer of the present invention described above; and
 b) mixing said ionomer with an amount of an ionic liquid that is effective to increase the polymer free volume.

In some embodiments of the aspect, at least one of the ionomer and the ionic liquid is dissolved in water prior to being admixed. In some embodiments, step a) further comprises introducing a divalent cation the ionomer to form cross-links. In some embodiments, the admixture of the ionomer and the ionic liquid is formed at a temperature of between about 100° C. to 250° C. In some embodiments, the method further includes pressing the admixture at a pressure of between about 500 and about 2000 psi.

Another aspect of the invention includes an article of manufacture thermoformed from the above described polymer composition. In some embodiments of the aspect, the article is thermoformed at a temperature between about 100° C. and about 250° C. and a pressure between about 500 and about 2000 psi. In some embodiments, the article is a non-toxic, recyclable and biodegradable food packaging, flexible user interfaces, fuel cell membranes, an environmentally benign adhesives, or catalyst complexes.

DETAILED DESCRIPTION

Various embodiments of the present invention provide novel inorganic polymer compositions and methods of preparing the compositions. The inorganic polymers described herein exhibit advantages over traditional polymers in multiple aspects including structural flexibility, chemical and thermal stability, and applicability to various manufacturing processes.

While the following text may reference or exemplify specific steps of ceramics sintering, it is not intended to limit the scope of the invention to such particular reference or examples. Various modifications may be made by those skilled in the art, in view of practical and economic considerations, such as the additives in the inorganic polymer and the specific composition of the ionic liquid. In order to more clearly and concisely describe the subject matter of the claims, the following definitions are intended to provide guidance as to the meaning of terms used herein.

The articles "a", "an" and "the" as used herein mean "one or more" or "at least one," unless otherwise indicated. That is, reference to any element or component of the present invention by the indefinite article "a" or "an" does not exclude the possibility that more than one of the element or component is present.

The term "about" as used herein means the referenced numeric indication plus or minus 10% of that referenced numeric indication.

The term "ionic liquid" is used herein consistently with the conventional, well-understood meaning of this term. Johnson, "What Is An Ionic Liquid?" *Electrochem. Soc. Interface*, 38-41 (Spring 2007). "Ionic liquid" thus refers to salts (e.g. compositions comprising cations and anions) that are liquid at or below a certain temperature of, for example 100° C., and remain liquid above 200° C. and have low vapor pressures and moderate specific conductivities. However, an ionic liquid may exist in a solid state at room temperature. In some embodiments, the ionic liquid used in the present invention has a minimum melting point of about −40° C. In some embodiments, the ionic liquid used in the present invention has a maximum melting point of about 26° C.

The term "glass transition (softening) temperature" as used herein refers to a temperature where an amorphous material undergo reversible transition from a hard or solid state into a molten or liquid state.

Polymer Composition

Figure 1A:
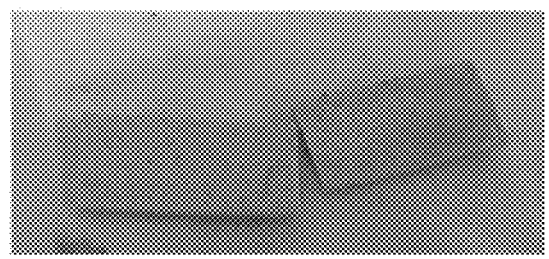
FIGS. 1A and 1B illustrate large and small compression molded samples, respectively, of an inorganic polymer of the present invention.
Figure 1B:
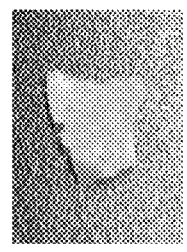

One aspect of the present invention provides an inorganic polymer containing an ionic liquid and a polymer comprising repeating units of the structure I or II:

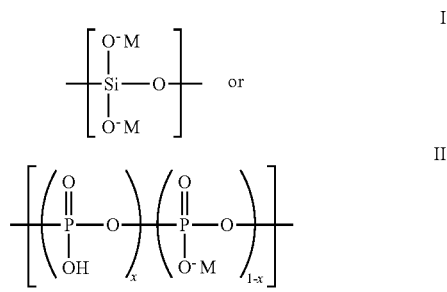

wherein 0≤x<1 and each M is a alkali metal independently selected from the group consisting of Lithium (Li), Sodium (Na), Potassium (K), Rubidium (Rb) and Cesium (Cs). The polymer and the ionic liquid may be complexed to each other via electrostatic interaction or ionic bonding. FIG. 1 illustrates an inorganic polymer of the present invention.

Figure 2:
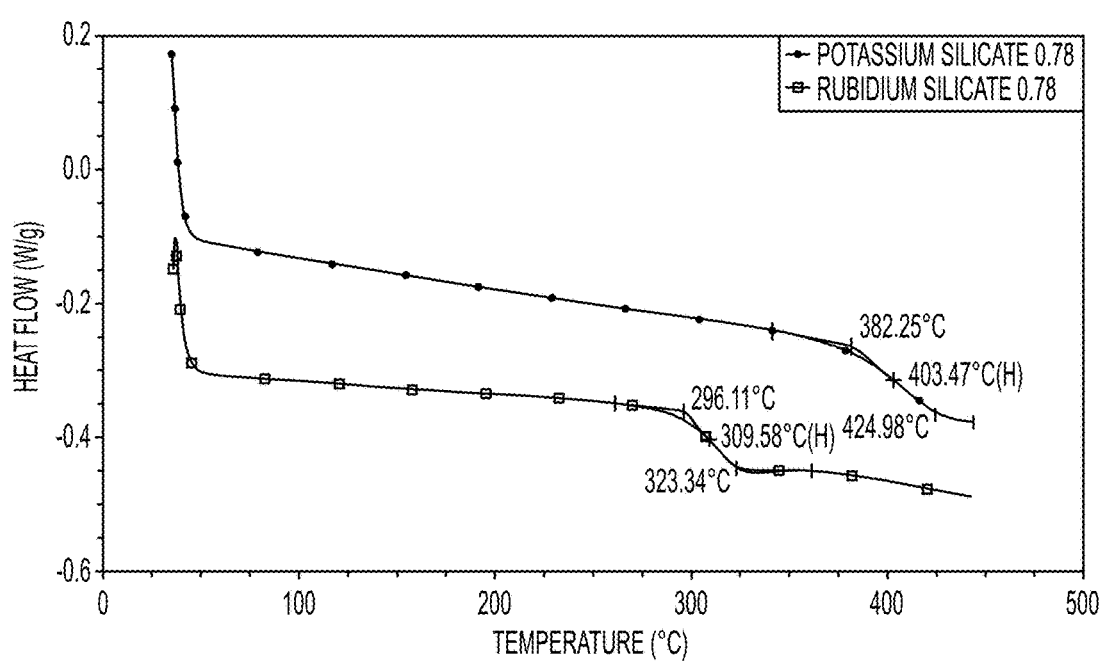
FIG. 2 illustrates the increase in glass transition (softening) temperature from Rubidium to Potassium.

Two or more alkali metals may co-exist in a polymer. Such a combination of various metal cations allows for the modification of certain properties. For example, because the strength of ionic bonds decreases as the size of counterion increases (e.g., ionic strength increases in the order:

Li$^+$>Na$^+$>K$^+$>Cs$^+$), use of cesium ions in a polymer with predominant sodium cations can reduce the softening temperature. FIG. 2 illustrates the increase in glass transition (softening) temperature from Rubidium to Potassium.

An inorganic ionomer can contain both structure I and structure II, the ratio of which can be determined based on the specific need and target application of the ionomer.

Divalent cations may be introduced to the inorganic polymers of the present invention, for example, by adding a metal oxide during the production of the polymer. The presence of such divalent cations plays various roles in modifying the physical and chemical properties of the polymer. For example, a Calcium cation may serve as a cross-linker and thus provide properties of harder plastics. In some embodiments, a Barium cation may be introduced to reduce the hygroscopicity. The exact amount of the divalent cation in the polymer can be determined based on the specific needs by one of ordinary skill in the art without undue experiments.

Figure 3:
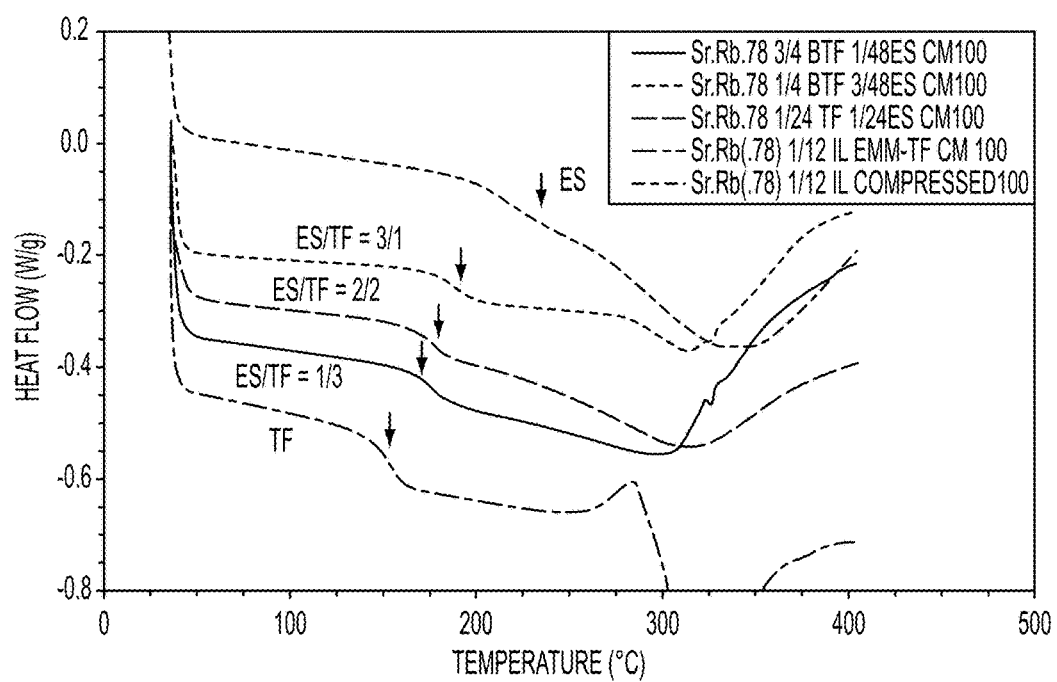
FIG. 3 illustrates the effect of ionic liquid on the glass transition temperature.
Figure 4:
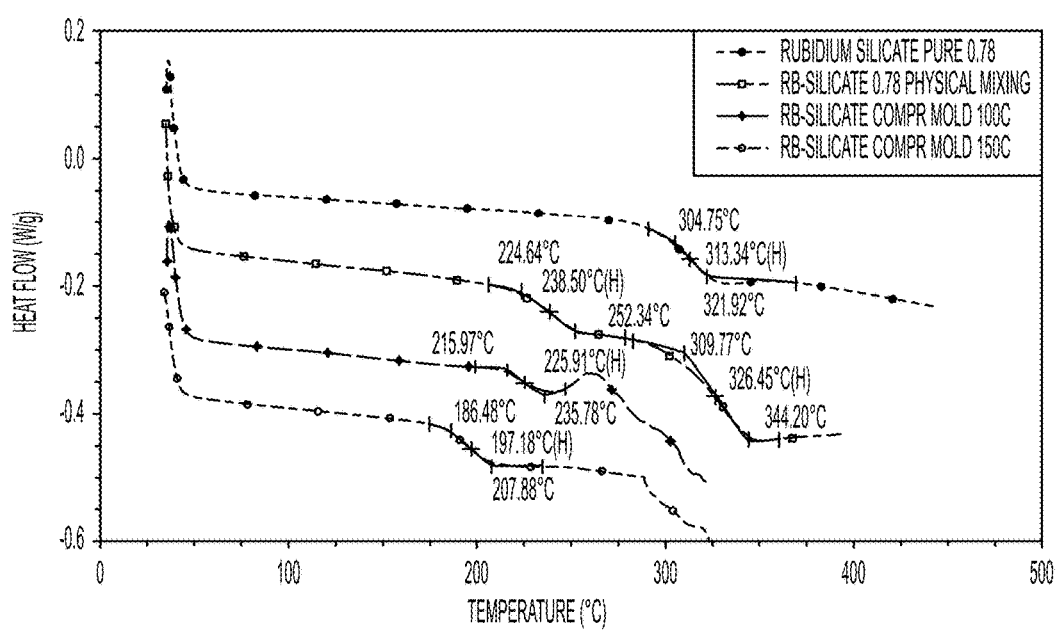
FIG. 4 illustrates the effect of compression molding temperature on the glass transition temperature of the inorganic polymer.
Figure 5A:
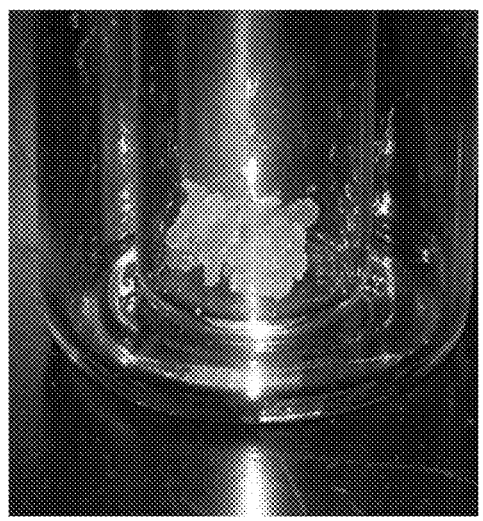
FIGS. 5A-C illustrate the changes in physical appearance of the polymer-ionic liquid under different compression molding conditions.
Figure 5B:
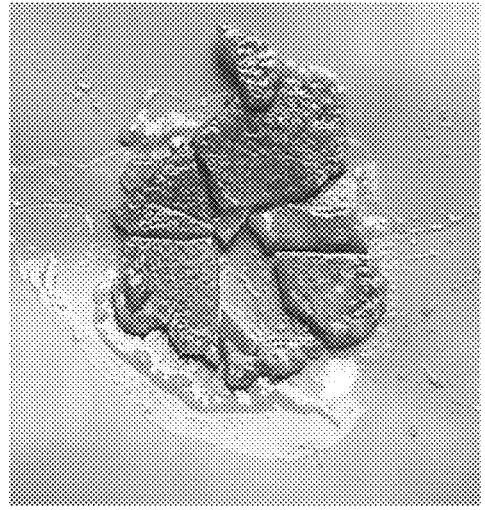
Figure 5C:
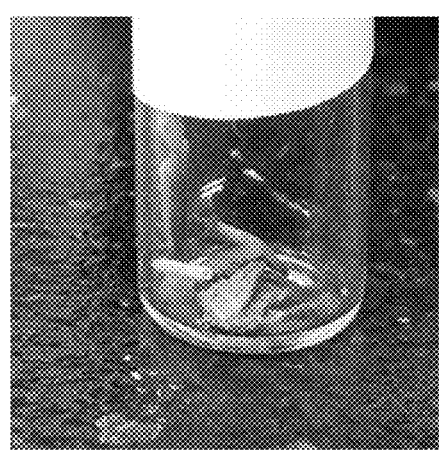

An ionic liquid may contribute to various aspects in the properties of the polymer composition. For example, ionic liquids can weaken or interfere with ionic bonds, and thereby increase the free volume of the polymer, akin to a plasticizer for carbon based polymers, making processing easier and adding flexibility to polymers. As a result, the inorganic polymer may exhibit a lowered glass transition temperature. FIG. 3 illustrates the impact of ionic liquids on the glass transition temperature. FIG. 4 further illustrates the effect of compression molding temperature on the glass transition temperature of the inorganic polymer. With the condition changing from physical mixing to compression molding at elevated temperature, the glass transition temperature decreases significantly. Meanwhile, the physical appearance also changes as illustrated in FIG. 5.

Various types of ionic liquids are suitable for use in the present invention. The cation moiety of an ionic liquid may be alkyl-ammonium based or heterocyclyl based, and ionic liquids based upon such cations are well known and commercially available. Non-limiting examples of heterocyclyl based cations include pyridinium, pyridazinium, pyrimidinium, pyrazinium, imidazolium, pyrazolium, oxazolium, 1,2,3-triazolium, 1,2,4-triazolium, thiazolium, piperidinium, pyrrolidinium, quinolium, isoquinolium. Alkyl-ammonium based cations include for example tetraalkyl ammonium such as cetyl trimethyl ammonium, lauryl trimethyl ammonium, myristyl trimethyl ammonium, stearyl trimethyl ammonium, arachidyl trimethyl ammonium, cetyl dimethylethyl ammonium, lauryl dimethylethyl ammonium, myristyl dimethylethyl ammonium, stearyl dimethylethyl ammonium, arachidyl dimethylethyl ammonium, or mixtures thereof. Non-limiting examples of the anion moiety include halides (e.g., fluoride, chloride, bromide, and iodide), sulfates ($SO_4^-$), carbonates, bicarbonates, phosphates, phosphates, nitrates ($NO_3^-$), nitrites ($NO_2^-$), acetates ($CH_3CO_2^-$), $PF_6^-$, $BF_4^-$ TfO$^-$($CF_3SO_2^-$), $CF_3(CF_2)_3SO_2^-$, $CF_3SO_2)_2N^-$, trifluoroacetate ($CF_3CO_2^-$), and heptafluorobutanoate ($CF_3(CF_2)_3SO_2^-$). Various types of ionic liquids and the corresponding synthesis are well known in the literature, including for example, U.S. Pat. Nos. 8,623,189, 8,802,596, and U.S. Pat. App. No. 20110045277, the entire disclosures of which are hereby incorporated by reference.

In some exemplary embodiments, the ionic liquid is selected from 1-ethyl-3-methylimidazolium triflate, choline dihydrogenphosphate, ethylammonium nitrate, triethylsulfonium bis(trifluoromethylsulfonyl)imide, 1-butylpyridinium bis(trifluoromethylsulfonyl)imide, 1-allyl-3-methylimidazolium iodide, 1-ethyl-3-methylimidazolium diethylphosphate, 1-butyl-3-methylimidazolium hexafluorophosphate, 1-ethyl-3-methylimidazolium ethyl sulfate and combinations thereof.

Exemplary melting point of the ionic liquid includes lower than about 90° C., lower than about 80° C., lower than about 70° C., lower than about 60° C., lower than about 50° C., lower than about 40° C., lower than about 35° C., lower than about 30° C., lower than about 26° C., lower than about 24° C., lower than about 22° C., lower than about 20° C., lower than about 15° C., lower than about 10° C., lower than about 5° C., lower than about 0° C., lower than about −5° C., lower than about −10° C., lower than about −15° C., lower than about −20° C., lower than about −25° C., lower than about −30° C., lower than about −35° C., lower than about −40° C., lower than about −45° C., lower than about −50° C. In some embodiments where two or more ionic liquids are being used, the exemplary ranges of the melting points include from about −55° C. to about 40° C., from about −50° C. to about 35° C., from about −45° C. to about 30° C., from about −40° C. to about 26° C., from about −40° C. to about 25° C., and from about −40° C. to about 20° C.

The exact ratio between the ionic liquid and the inorganic ionomer depends on various factors including the specific composition of the ionomer and the ionic liquid, the desirable application of the composition, and other ingredients in the composition. In non-limiting exemplary embodiments, the ratio between the ionic liquid and the anion of the inorganic ionomer is about 1:20, 1:18, 1:16, 1:15, 1:14, 1:13, 1:12, 1:11, 1:10, 1:9, 1:8, 1:7, 1:6, 1:5, 1:4:1:3, 1:2, 1:1, 2:1, 4:1, 6:1, 8:1, or 10:1. The anion of the inorganic ionomer refers to, for example in the structure I, —O$^-$, which is bonded to Si and forms a pair with a corresponding cation of M. In structure II, the anion —O$^-$ is bonded to P and forms a pair with cation M.

Figure 6A:
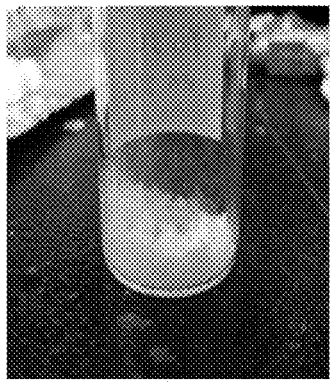
FIGS. 6A-C illustrate the different physical appearances after physical mixing of an ionic liquid and an inorganic polymer in various ratios.
Figure 6B:
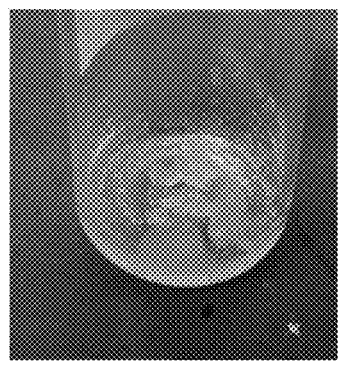
Figure 6C:
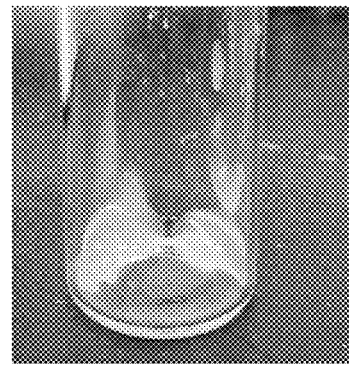

The physical appearance of the inorganic polymer may be affected by even the mere physical mixing with an ionic liquid. As illustrated in FIG. 6, the physical mixing samples show increased softness and smoothness when mixed with higher ratios of an ionic liquid (IL). The ¼ IL sample seems to be a "goo" and is softer compared with the 1/16 IL sample. This indicates that the ionic liquid is interacting with the polymer, albeit on the surface level.

The polymer composition of the present invention finds application in various fields. In some embodiments, the polymer composition serves as a carrier of nanosize catalysts. Specifically, transition metal cations can be introduced to a certain percentage of the unit of structure I or II. Because these ions exist as ionic aggregates of nm size, they can be reduced to form metal nanoparticles which are dispersed in the ionomer matrix. Nano-sized metal particles can be used as very effective catalysts due to huge surface area compared with macroscopic catalyst powders. In exemplary embodiments, the transition metal is introduced into about 0.5%, 1%, 2%, 3%, 4%, 5%, 6%, 7%, 8%, 9%, or 10% of structural units I or II. In some embodiments, the transition metal is Nickel, Palladium, Platinum, Copper or Gold. Divalent transition metals can also be used as cross-linking ions, as can divalent lanthanides.

The polymer of the present invention may also be used as flexible user interfaces. In some embodiments, the polymer composition can be composited with conductive materials, such as carbon black, carbon nanotube, and graphene. The presence of ionic groups in the polymers invented will ensure good bonding (via ionic bonds to be formed) to metals and semiconductors that are deposited on the film.

Figure 7:
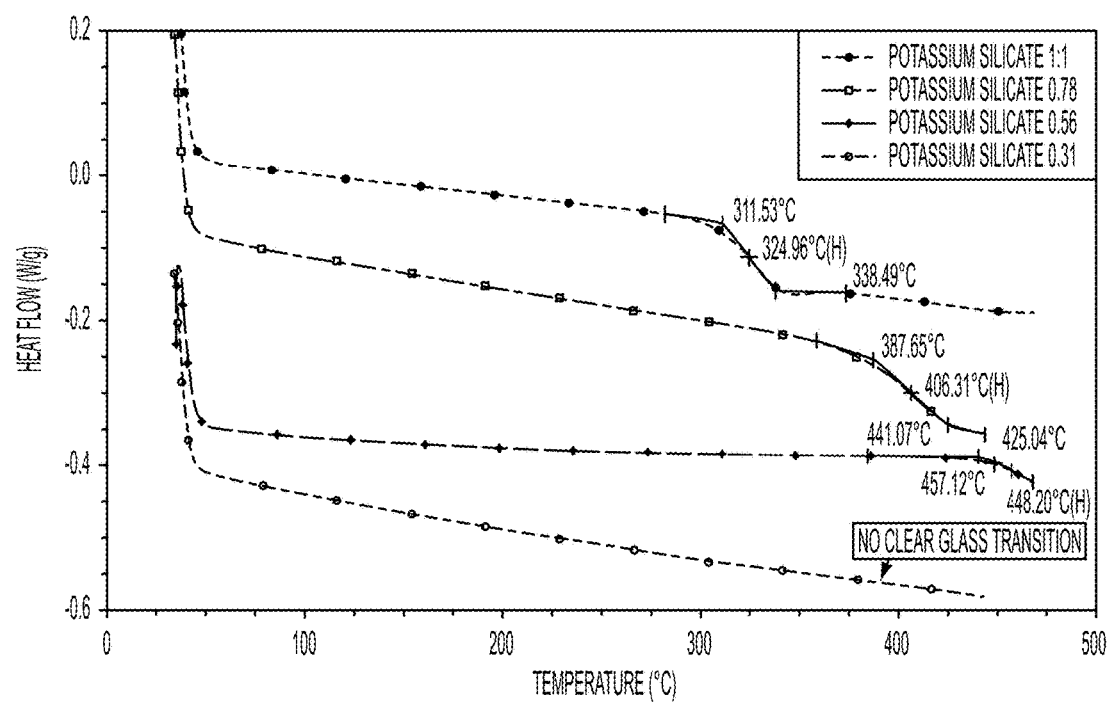
FIG. 7 illustrates the effect of Silicate-Potassium Oxide ratio on glass transition temperature.

Various factors, including the ionic liquid, the cations, and the ratio between different components of the polymer, may affect the glass transition temperature of the inorganic polymer. In some embodiments, the ratio between the metal oxide (e.g. $K_2O$ derived from $K_2CO_3$) and the silicate ($SiO_2$) may significantly impact the glass transition temperature. As shown in FIG. 7, the glass transition temperature increases as the ratio between $SiO_2$ and $K_2O$ decreases. In non-limiting embodiments, the ratio between $SiO_2$ and $M_2O$ is about 4:1, 3.9:1, 3.8:1, 3.7:1, 3.6:1, 3.5:1, 3.4:1, 3.3:1, 3.25:1, 3.23:1, 3.2:1, 3.18:1, 3.15:1, 3.12:1, 3.1:1, 3.08:1, 3.05:1, 3.03:1, 3:1, 2.98:1, 2.95:1, 2.93:1, 2.9:1, 2.88:1, 2.85:1, 2.83:1, 2.8:1, 2.78:1, 2.75:1, 2.73:1, 2.7:1, 2.68:1, 2.65:1, 2.63:1, 2.6:1, 2.58:1, 2.55:1, 2.53:1, 2.5:1, 2.48:1, 2.45:1, 2.43:1, 2.4:1, 2.38:1, 2.35:1, 2.33:1, 2.3:1, 2.28:1, 2.25:1, 2.23:1, 2.2:1, 2.18:1, 2.15:1, 2.13:1, 2.1:1, 2.08:1, 2.05:1, 2.03:1, 2:1, 1.98:1, 1.95:1, 1.93:1, 1.9:1, 1.88:1, 1.85:1, 1.83:1, 1.8:1, 1.78:1, 1.75:1, 1.73:1, 1.7:1, 1.68:1, 1.65:1, 1.63:1, 1.6:1, 1.58:1, 1.55:1, 1.53:1, 1.5:1, 1.48:1, 1.45:1, 1.43:1, 1.4:1, 1.38:1, 1.35:1, 1.33:1, 1.3:1, 1.28:1, 1.25:1, 1.23:1, 1.2:1, 1.18:1, 1.15:1, 1.13:1, 1.1:1, 1.08:1, 1.05:1, 1.03:1, or 1:1. In some non-limiting examples, the ratio between $SiO_2$ and $M_2O$ includes about 1:1, 1:0.98, 1:0.95, 1:0.92 1:0.9, 1:0.88, 1:0.85, 1:0.82, 1:0.8, 1:0.78, 1:0.75, 1:0.72, 1:0.7, 1:0.68, 1:0.65, 1:0.62, 1:0.6; 1:0.58, 1:0.55, 1:0.52, 1:0.5, 1:0.48, 1:0.45, 1:0.42, 1:0.4, 1:0.38, 1:0.35, 1:0.32, 1:0.3, 1:0.28, 1:0.25, 1:0.22, 1:0.2, 1:0.18, 1:0.15, 1:0.12, 1:0.1.

Accordingly, control of the glass transition temperature of the polymer can be achieved by selecting suitable components such as cations and ionic liquids and adjusting the ratio of the different components of the polymer. Exemplary glass transition temperatures of the inorganic ionomer of the present invention include lower than about 300° C., lower than about 250° C., lower than about 220° C., lower than about 200° C., lower than about 180° C., lower than about 160° C., lower than about 140° C., lower than about 120° C., and lower than about 100° C.

Figure 8:
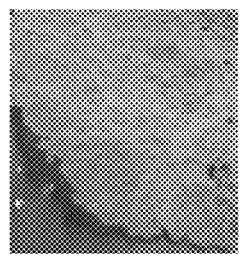
FIG. 8 illustrates a blend sample made of an inorganic polymer and a small amount of poly(ethylene oxide), showing a large degree of ductility.

Mixing the inorganic polymer with other polymers may lead to various desirable properties. As illustrated in FIG. 8, introduction of a small amount of ductile polymer makes the inorganic polymer more ductile and allow the inorganic polymer to stretch without brittle fracture. Suitable secondary polymers include various carbon-based polymers such as polyethylene oxide and poly(propylene oxide), and poly (phenylene oxide). The amount of the secondary polymer is dictated by the specific composition of the polymer and the property to be achieved. Non-limiting range for the secondary polymer include about 0.1%, 0.2%, 0.5%, 1%, 2%, 3%, 4%, 5%, 6%, 7%, 8%, 9%, 10%, 15%, 20%, 25%, 30%, 35%, 40%, 45%, and 50% by weight in the polymer mixture.

Polymers of the present invention are superior to other silicon-based polymers in multiple aspects. For example, Silicones (polysiloxanes), based on Si—O bonds, have been used for grease, rubber, and plastics. However, they contain organic groups (e.g., $CH_3$) in the side chains, making them a hybrid of organic/inorganic, which lessens the benefits of inorganic polymers (e.g., nontoxicity and non-flammability) . Moreover, since silicones are neutral polymers (not ionomers), the only method available to modify properties (e.g., flexibility) is introduction of covalent cross-links, which are irreversible. In some embodiments, the polymers of the present invention are purely inorganic along the polymer chains; that is, with regard to the polymer backbone. Further, the reversible ionic bonds can be used to control the properties of the polymer for the Si—O and P—O based polymers of the present invention.

Production of Inorganic Ionomers

Another aspect of the invention provides a method of preparing a polymer composition comprising:

a) providing a polymer comprising repeating units of the structure I or II:

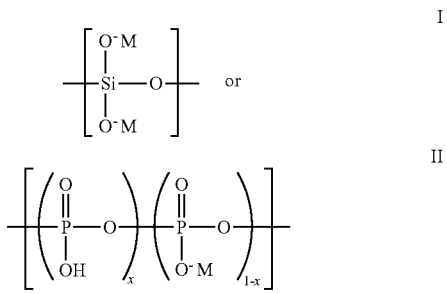

wherein 0≤x<1 and each M is an alkali metal cation independently selected from the group consisting of Lithium$^+$ (Li$^+$), Sodium$^+$ (Na$^+$), Potassium$^+$ (K$^+$), Rubidium$^+$ (Rb$^+$) and Cesium$^+$ (Cs$^+$); and b) mixing said ionomer with an amount of an ionic liquid that is effective to increase the polymer free volume.

Polymers having structural unit I or II can be prepared by various methods. The following approaches illustrate non-limiting production processes for the polymers of the present invention.

Approach I: Condensation Polymerization of Component Monomers to Form Polymers

Along the first line, for example, cesium silicate ($Cs_2H_4SiO_4$) is polymerized via (melt) condensation polymerization to produce silicate polymers.

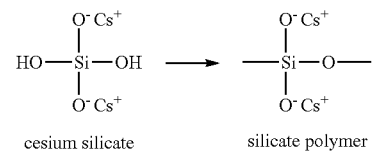

cesium silicate     silicate polymer

Because OH side groups are unstable, e.g., reacting with other OH groups to form cross-links or leading to depolymerization, these groups are converted to cesium silicates that are more stable. Because the strength of ionic bonds decreases as the size of counterion increases (e.g., ionic strength increases in the order: Li$^+$>Na$^+$>K$^+$>Cs$^+$), use of cesium ions can reduce the softening temperature significantly. A small amount of CaO or another Group 2 alkaline earth oxide or salt may be added to introduce strong cross-links (Ca-bonds; calcium is a divalent cation) depending on the applications.

Thus, Cesium silicate ($Cs_2H_2SiO_4$) is heated in a crucible to carry out condensation polymerization, leading to cesium polysilicates and water.

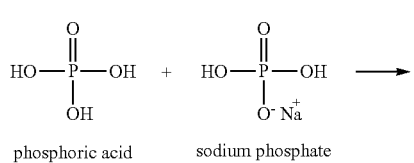

phosphoric acid     sodium phosphate

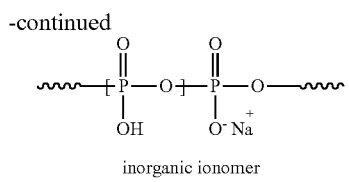

inorganic ionomer

In another example, phosphoric acid (H$_3$PO$_4$) and sodium phosphate (NaH$_2$PO$_4$) are copolymerized via (melt) condensation polymerization to produce polyphosphate ionomers. If needed, CaO is added to introduce strong cross-links (Ca-bonds).

Thus, phosphoric acid (H$_3$PO$_4$) and sodium phosphate (NaH$_2$PO$_4$) are mixed and heated in a crucible at high temperature (over 1000° C.), where condensation reaction occurs. The ionic content can be adjusted by changing the ratio of component monomers. CaO is added at melt to introduce divalent bonds as ionic cross-links when harder plastics are needed.

Approach II: Conversion of Hard Si—O Based Minerals and Glasses to Soft, Processable Polymers Along the second line, for example, silicate (SiO$_2$) or silicate glass is mixed with a large amount of Cs$_2$CO$_3$ at high temperature, leading to easily processable melt.

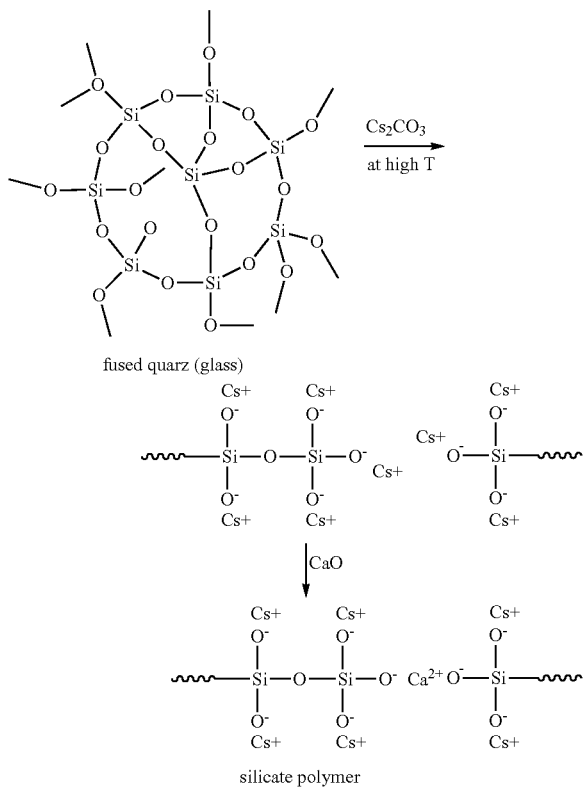

Because large monovalent ions (Cs$^+$) can weaken ionic bonds significantly, softening temperature is dropped significantly. Then, a controlled amount of CaO or other Group 2 alkaline earth oxide or salt can be added to introduce strong ionic bonds (Ca-bond) to polymer chains, making them resistant to heat and chemicals (including water). This is somewhat similar to the procedure of making thermoset resins, which have been widely used as engineering plastics, such as strong adhesives and the matrix of advanced composite materials.

Thus, silicate (SiO$_2$) is mixed with cesium carbonate (Cs$_2$CO$_3$) in a crucible and heated above the softening temperature of the glass, to make cesium silicate glass. This is water soluble and has a low softening temperature.

In the above illustrated approaches, metal oxides such as Na$_2$O and K$_2$O can be added to fine tune the properties (e.g. glass transition temperature) of the polymer. The larger the counterions (Cs$^+$>K$^+$>Na$^+$), the lower the softening temperature. Alternatively, the reactions between alkali metal oxide (e.g. Na$_2$O and K$_2$O) and silicate (SiO$_2$) also lead to the formation of inorganic polymers. A source of the metal oxide (e.g. Na$_2$O) is the corresponding metal carbonate (e.g. Na$_2$CO$_3$). By varying the ratio between the SiO$_2$ and the metal oxide, the glass transition temperature of the resulting polymer can be controlled.

The addition of an ionic liquid can weaken ionic bonds and increase chain mobility, thereby making the polymer more processable and flexible. This is somewhat similar to the addition of a plasticizer to organic polymers to enhance processability and flexibility of the resulting polymers. Unlike usual plasticizers, ionic liquids can work at much higher temperatures and plasticize ionic groups.

An ionic liquid may be added to the polymer in various forms and at different stages for the production of the polymer. For example, an ionic liquid, or an inorganic polymer, or both, can be mixed in powder or in solution depending on the conditions used. Suitable solvents can be organic, aqueous or a mixture of various volatile components. In some embodiments, water-soluble glass is useful for that purpose when the degradation of ionic liquid at above certain temperature is a concern.

In some exemplary embodiments, solid polymers made either by Approach I or Approach II are ground (size-reduced) and mixed with an IL (ex. 1-butyl-3-methylimidazolium hexafluorophosphate). The resulting mixture is in a powder form. Then, the mixture is heated in a crucible at the temperature above the softening temperature, when the softening temperature is rather low (for example 300° C. or less). The resulting material can be processed to a desired shape by compression molding or injection molding. Alternatively, the ionic polymer powders are dissolved in water and an IL is added under stirring. After evaporation of water, bulk material is ground to a powder form. The powder is processed to a desired shape by injection molding or compression molding.

In some embodiments, an ionic liquid is used as a medium for the preparation of the inorganic polymer. Ionic liquids have become popular alternative media for chemical synthesis because of their low volatility and low toxicity. See e.g., Wasserscheid and Keim, *Angew Chem Int Ed Engl*, 2000, 39:3772; and Wasserscheid, "Ionic Liquids in Synthesis," 1$^{st}$ Ed., Wiley-VCH, 2002. Further, ionic liquids can reduce costs, disposal requirements, and hazards associated with volatile organic compounds. Other exemplary properties of ionic liquids are high ionic conductivity, non-volatility, non-flammability, high thermal stability, wide temperature for liquid phase, highly solvability, and non-coordinating. For a review of ionic liquids see, for example, Welton, *Chem. Rev.* 1999, 99:2071-2083; and Carlin et al., Advances in Nonaqueous Chemistry, Mamantov et al. Eds., VCH Publishing, New York, 1994.

When prepared as an amorphous phase, the inventive ionomers are considered to be a plastic glass: conventional silicate glass comprises a highly (covalently) cross-linked 3D structure, whereas the silicate polymers have less "constrained" 2D and 1D structures:

Also, like polyethylene, some silicate polymers can be semi-crystalline, comprising a crystalline region (as found in minerals) and an amorphous region (as found in amorphous silicate glasses). The cross-links can be incorporated by divalent bonds. The molecular parameters can be altered to modify polymers for targeted applications. For example, the properties of the silicate polymers can change all the way from a soft rubbery material to a very hard plastic by increasing the number of ionic groups (cross-links); by controlling the number of divalent bonds, we can produce various types of polymers (rubber, fiber, resin), unlike neutral polymers. This is one clear advantage of using ionic polymers as opposed to neutral polymers.

In some embodiments, bivalent cations in the form of oxides or salts can be introduced to modify the properties of the inorganic polymer. For example, the addition of Calcium oxide during the production process leads to the formation of cross-links and as a result harder plastic-like material. To minimize the hygroscopicity of the polymer, Barium cations may be introduced.

The ionomer and the ionic liquid can be mixed and then heated to a desirable temperature. Alternatively, the ionomer and the ionic liquid can be mixed at an elevated temperature. In some embodiments, the mixture of the inorganic polymer and the ionic liquid is heated. The resulting material may exhibit different properties depending on the specific temperature. Non-limiting exemplary temperatures include about 50-75° C., about 75-100° C., about 100-125° C., about 125-150° C., about 150-175° C., about 175-200° C., about 200-225° C., about 225-250° C., about 250-275° C., about 275-300° C., about 300-325° C., about 325-350° C., about 350-400° C., about 400-450° C., and about 450-500° C. Processing the material at various pressures may also lead to changes in properties. Non-limiting exemplary pressures include about 10-50 psi, about 50-100 psi, about 100-200 psi, about 200-300 psi, about 300-500 psi, about 500-750 psi, about 750-1000 psi, about 1000-1250 psi, about 1250-1500 psi, about 1500-1750 psi, about 1750-2000 psi, about 2000-2250 psi, about 2250-2500 psi, about 2500-2750 psi, about 2750-3000 psi.

The effect of the temperature and pressure is also illustrated in FIGS. 4 and 5. The compression molded samples, as the temperature increased, changed color from light yellow (no heat), to bright red at 150° C., and to lighter color again at 200° C. It was also observed that the polymer turned harder at 150° C. and exhibited strong adhesion with Teflon at 200° C.

In some embodiments, the method further comprises mixing a carbon-based polymer into the inorganic polymer to impart various desirable properties. As illustrated in FIG. 8, introduction of a small amount of an organic polymer more ductile than the inorganic polymer makes the inorganic polymer more ductile and allows the inorganic polymer to stretch without brittle fracture. Depending on the properties of the specific carbon-based polymer and the target composition, the secondary polymer can be added at any stage of the production process, including for example during the condensation of silicate and metal carbonate, and before or after the introduction of the ionic liquid. Heating or pressure may be applied if necessary to achieve desired product attributes.

Suitable secondary polymers to be mixed with the inorganic ionomer include various carbon-based polymers such as polyethylene oxide and poly(propylene oxide), and poly (phenylene oxide). The amount of the secondary polymer is dictated by the specific composition of the polymer and the property to be achieved. Non-limiting range for the secondary polymer include about 0.1%, 0.2%, 0.5%, 1%, 2%, 3%, 4%, 5%, 6%, 7%, 8%, 9%, 10%, 15%, 20%, 25%, 30%, 35%, 40%, 45%, and 50% by weight in the polymer mixture.

Article of Manufacture

Another aspect of the present invention provides an article of manufacture comprising the above described polymer composition. The article can be thermoformed from the polymer composition according to the above described methods. In an exemplary embodiment, the article of manufacture is thermoformed at a temperature between about 100° C. and about 250° C. and a pressure between about 500 and about 2000 psi. Modifications and adjustments can be made for the production process depending on the specific article. The following non-limiting embodiments illustrate the article of manufacture of the present invention.

Food Packaging.

Organic ionomers (ex. Surlyn®) have been widely used for packaging, for example, as a meat packing material due to good chemical (oil) resistance. Since the fragments of organic polymers tend to be toxic, replacement with non-toxic material is desirable. Si—O (and P—O) bond compounds are in general nontoxic, in fact, they are used as additives to food (e.g., cola and other soft drinks) and cosmetics. These plastics can be recyclable and biodegradable, since basic structure is similar to natural sand and rock.

Most polymers currently used for food packaging are not totally recyclable or biodegradable. Since they are petrochemical-based and as such have environmental and human costs, including the consumption of finite fossil resources, use of inorganic ionomers containing Si—O and/or P—O bonds as packaging material will overcome these problems.

Novel Polymer for Flexible User Interfaces.

The present invention with nontoxic and flame retardant polymers, when made flexible, can be used for flexible user interface. Flexibility arises from easy rotation around Si—O (and P—O) bonds, as compared with usual C—C bonds found in organic polymers, and further enhanced by the addition of ionic liquid as a "plasticizer." The resultant polymer can be composited with conductive materials, such as carbon black, graphite, carbon nanotube, and graphene. The presence of ionic groups in the polymers invented will ensure good bonding (via ionic bonds to be formed) to metals and semiconductors that are deposited on the film.

Fuel Cell Membranes.

Fuel cell membranes most widely used are Nafion® (Teflon-based sulfonated ionomer), and Nafion® as well as many polymers under investigations are organic polymers with sulfonic acid groups or carboxylic acid groups. So far, inorganic ionomers (acid form) have not been considered. One of the problems of Nafion® is poor performance at high temperature, which is needed for efficient operation of fuel cells. Because Si—O and/or P—O based polymers can be fabricated as membrane material with high temperature characteristics, fuel cell membranes with better performance will be produced. Because fuel cells are widely used and will be more extensively used in the future as a power source, from computers to automobiles, potential market will be significant. Since phosphoric acid (small molecule) is already used for fuel cell, polymer made from phosphoric acid should work if membranes with enough strength and flexibility are fabricated.

Environmentally Benign Adhesives.

Organic ionomers, such as butylenes ionomer and EPDM-based ionomers, are widely used as adhesives due to ionic bonds formed between substrates. Inorganic ionomers can be used as adhesives, which are especially useful at high temperature, where many organic polymer-based adhesives become less effective. Since these inorganic polymers are not petroleum-derived, they do not produce VOC (volatile organic compound), and are biodegradable and recyclable, thus environmentally benign.

Catalysts.

Metal ions that can be used as metal catalysts, such as palladium (Pd) and gold (Au), can be incorporated into ionomers as counterions. Because these ions exist as ionic aggregates of nm size, they can be reduced to form metal nanoparticles which are dispersed in the ionomer matrix. Nano-sized metal particles can be used as very effective catalysts due to huge surface area compared with macroscopic catalyst powders. The system is somewhat similar to zeolite-supported nano-catalysts, currently investigated as effective catalyst systems. In our system, flexibility of polymers can be altered from flexible to rigid by increasing Ca cross-links. When a membrane with nano metal catalyst (e.g. Pd) is formed, this can be used as a very effective fuel cell membrane.

The examples set forth below also serve to provide further appreciation of the disclosed invention, but are not meant in any way to restrict the scope of the invention.

EXAMPLES

Example 1

Silicate ($SiO_2$) was mixed with cesium carbonate ($Cs_2CO_3$) and heated (500-1000° C.) in a crucible to make cesium metasilicate glass, which is water soluble and has low softening temperature. The so-produced polymer was ground and mixed with solid ionic liquid (IL: either 1-butyl-3-methylimidazolium hexafluorophosphate or 1-ethyl-3-methylimidazolium ethyl sulfate). The resulting mixture was a powder form. Then, the mixture was heated in a crucible at the temperature above the softening temperature, when the softening temperature was rather low (approximately 300° C.). The resulting material was processed to a desired shape by compression molding or injection molding.

Alternatively, the ionic polymers were dissolved in water and IL was added under stirring. After evaporation of water, bulk material was ground to a powder form. The powder was processed to a desired shape by injection molding or compression molding.

Example 2

Phosphoric acid ($H_3PO_4$) and sodium phosphate ($NaH_2PO_4$) were mixed and heated in a crucible at high temperature (over 1000° C.), where condensation reaction occurred. The ionic content was adjusted by changing the ratio of component monomers. CaO was added at melt to introduce divalent bonds as ionic cross-links to produce harder plastics. The resulting polymer was ground and mixed with IL (either 1-butyl-3-methylimidazolium hexafluorophosphate or 1-ethyl-3-methylimidazolium ethyl sulfate). The resulting mixture was a powder form. Then, the mixture was heated in a crucible at the temperature above the softening temperature when the softening temperature was rather low (approximately 300° C.). The resulting material was processed to a desired shape by compression molding or injection molding.

Alternatively, the ionic polymers were dissolved in water and IL was added under stirring. After evaporation of water, bulk material was ground to a powder form. The powder was processed to a desired shape by injection molding or compression molding.

Example 3. Melt Polymerization

Polymerization was conducted in the melt state. Phosphoric acid ($H_3PO_4$) and sodium phosphate ($NaH_2PO_4$) were mixed and heated in a crucible at high temperature (500-1000° C.), where condensation reaction occurred. When incomplete polymerization occurred, chain length (molecular weight) were reduced. Thus, the chain length was controllable.

In another example, $SiO_2$ was mixed with $Cs_2CO_3$ with the ratio of $[SiO_2]/[Cs_2CO_3]=1$ and heated in a crucible at high temperature, producing polysilicates. The time of heating was adjusted to control the degree of polymerization. By increasing the purity of monomers, molecular weights were increased as in normal condensation polymerization.

The invention claimed is:

1. A polymer composition comprising an ionic liquid and an inorganic ionomer comprising repeating units of the structure I or II:

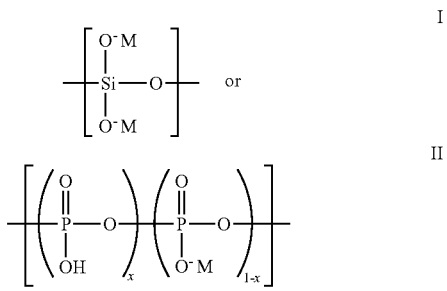

wherein 0≤x<1 and each M is an alkali metal cation independently selected from the group consisting of Lithium$^+$ (Li$^+$), Sodium$^+$ (Na$^+$), Potassium$^+$ (K$^+$), Rubidium$^+$ (Rb$^+$) and Cesium$^+$ (Cs$^+$), wherein said ionic liquid has melt point lower than 30° C. and is present in an amount effective to increase the free volume of said inorganic ionomer, and wherein the glass transition temperature of said inorganic ionomer is lower than about 250° C. in the admixture with said ionic liquid.

2. The polymer composition of claim 1, wherein said ionic liquid is selected from the group consisting of 1-ethyl-3-methylimidazolium triflate, choline dihydrogenphosphate, ethylammonium nitrate, triethylsulfonium bis(trifluoromethylsulfonyl)imide, 1-butylpyridinium bis(trifluoromethylsulfonyl)imide, 1-allyl-3-methylimidazolium iodide, 1-ethyl-3-methylimidazolium diethylphosphate, 1-butyl-3-methylimidazolium hexafluorophosphate, 1-ethyl-3-methylimidazolium ethyl sulfate and combinations thereof.

3. The polymer composition of claim 1, wherein molar ratio between the ionic liquid and the anion of the inorganic ionomer ranges from 1:1 to 1:16.

4. The polymer composition of claim 1, further comprising divalent cations crosslinking the inorganic ionomer anions.

5. The polymer composition of claim 4, wherein the divalent cations are selected from the group consisting of Calcium$^{2+}$, Barium$^{2+}$, and a combination thereof.

6. The polymer composition of claim 1, wherein:
a) the inorganic ionomer comprises repeating units of the structure I and further comprises a second unit of structure I, wherein M of said second unit is a positively charged transition metal cation derived from a transition metal in groups 3 to 12 on the periodic table; or b) the inorganic ionomer comprises repeating units of the structure II and further comprises a second unit of structure II, wherein M of said second unit is a positively charged transition metal cation derived from a transition metal in groups 3 to 12 on the periodic table.

7. The polymer composition of claim 6, wherein the transition metal is selected from the group consisting of Nickel, Palladium, Platinum, Copper and Gold.

8. The polymer composition of claim 1, further comprising a conductive material selected from the group consisting of carbon black, graphite, carbon nanotube, and graphene.

9. The polymer composition of claim 1, wherein said inorganic ionomer does not contain carbon.

10. The polymer composition of claim 1, further comprising a carbon-based polymer more ductile than said inorganic ionomer and admixed with said ionic liquid and said inorganic ionomer in an amount effective to increase the ductility of said composition.

11. The polymer composition of claim 10, wherein the carbon-based polymer is selected from the group consisting of poly(ethylene oxide), poly(propylene oxide), poly(phenylene oxide), and a combination thereof.

12. The polymer composition of claim 1, wherein the polymer composition is derived from a source for $SiO_2$ and a source for $M_2O$, and wherein the molar ratio between the $SiO_2$ and the $M_2O$ ranges from about 1:1 to about 3.25:1.

13. A method of preparing a polymer composition comprising:

a) providing an inorganic ionomer according to claim 1; and b) mixing said ionomer with an amount of an ionic liquid that is effective to increase the polymer free volume.

14. The method of claim 13, wherein step a) further comprises introducing a divalent cation the ionomer to form cross-links.

15. The method of claim 13, wherein the ionomer of step a) is prepared in a pure ionic liquid or a solution comprising an ionic liquid.

16. The method of claim 13, wherein the admixture of the ionomer and the ionic liquid is heated at a temperature of between about 100° C. to 250° C.

17. The method of claim 16, further comprising pressing the admixture at a pressure of between about 500 and about 2000 psi.

18. An article of manufacture thermoformed from the polymer composition of claim 1.

19. The article of manufacture of claim 18, wherein said article is thermoformed at a temperature between about 100° C. and about 250° C. and a pressure between about 500 and about 2000 psi.

20. The article of manufacture of claim 18, which is selected from the group consisting of non-toxic, recyclable and biodegradable food packaging, flexible user interfaces, fuel cell membranes, an environmentally benign adhesives, and catalyst complexes.

* * * * *